March 7, 1933.  F. GITZENDANNER  1,900,497
SHOCK ABSORBER
Filed Nov. 3, 1930
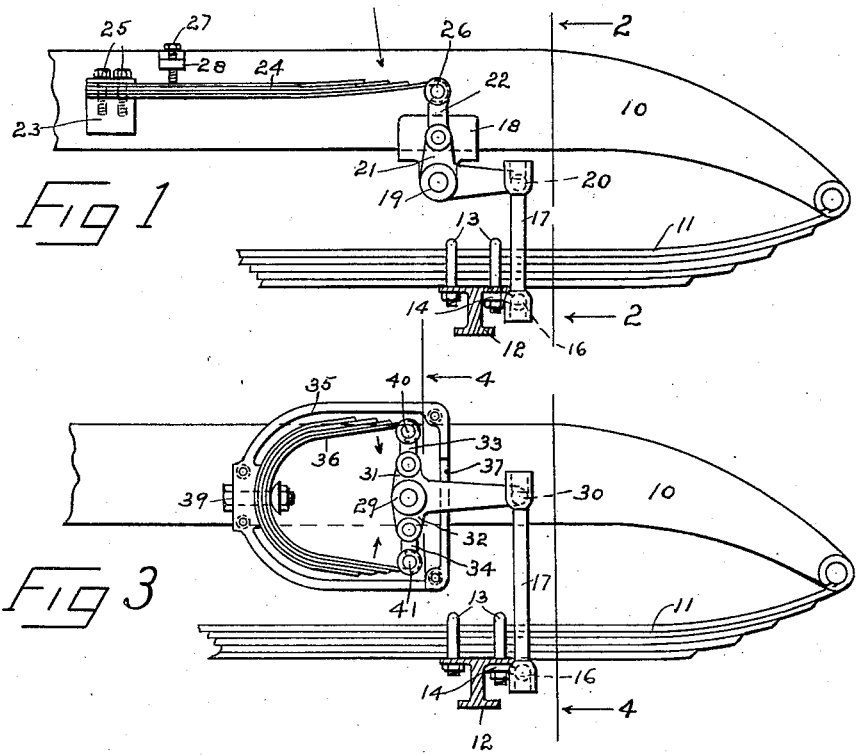
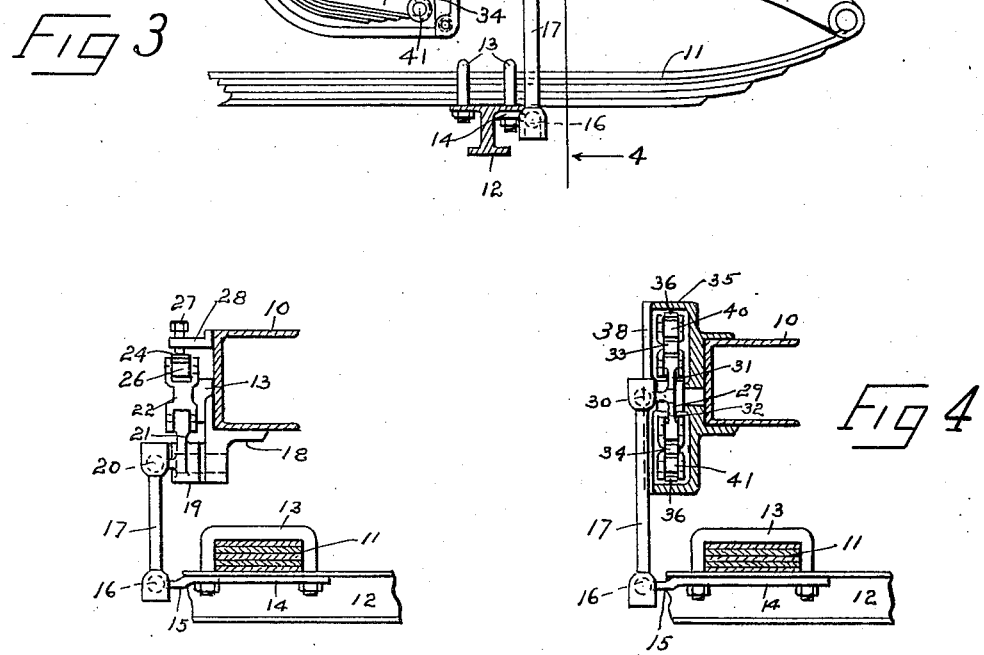
INVENTOR.
Fred Gitzendanner
BY
Henrik J. Schmidt
ATTORNEY.

Patented Mar. 7, 1933

1,900,497

UNITED STATES PATENT OFFICE

FRED GITZENDANNER, OF NEW YORK, N. Y.

SHOCK ABSORBER

Application filed November 3, 1930. Serial No. 492,911.

The invention relates to shock absorbers for automobiles and similar vehicles and has for its main object to provide a device having greater efficiency than those now in use. Another object is to provide a shock absorber which can be readily regulated to the load of the automobile, as well as to the condition of the road over which it is traveling. A further object is to provide a device which can be readily adapted to any make of automobile and which, owing to its strong and simple construction, will give service over a long period of time and which can still be manufactured at a relatively low price.

These and other objects and advantages will be readily understood from the following description and from the accompanying drawing of preferred embodiments of the invention, however certain modifications may be made without departing from the scope of the invention. In the drawing Fig. 1 is a side elevation showing an embodiment employing a single toggle link, Fig. 2 is a rear view of same taken on line 2—2, Fig. 3 is a side elevation showing an embodiment employing a double toggle link, Fig. 4 a rear view of same taken on lines 4—4.

In all the views, the standard chassis frame of an automobile is shown at 10, the spring at 11, rear axle at 12, and the shackle-bolts at 13. Each of the views also show a lever 14 which is secured on the rear axle by one of the shackle-bolts. Each of these levers has a rearwardly and outwardly extending arm 15 which terminates in a ball 16 which forms part of a universal joint provided in one end of a connecting link 17. The other ends of these links are also provided with universal joints.

Referring now to Figs. 1 and 2, a bearing 18 is secured to the chassis frame and on this bearing a bell crank 19 is mounted. One end of this bell crank terminates in a ball 20 which engages in the upper universal joint of the connecting link 17, while the other end 21 is connected to the bifurcated link 22. The end 21 and the link 22 together form a toggle link. A block 23 is also securely fastened to the chassis frame and on top of this block a leaf spring 24 is secured by bolts 25. The other end of this spring is secured to a pin 26 which is inserted in the upper, bifurcated end of the link 22. The pressure of the spring is in the direction indicated by the arrow and can be adjusted by the adjusting screw 27 which is carried by a second block 28, also secured on the chassis frame.

In Figs. 3 and 4, a double-armed bell crank 29 takes the place of the bell crank shown in Figs. 1 and 2. A ball 30, which engages in the universal joint in the connecting link 17, is formed on the long arm of the bell crank. The other arms 31 and 32 are connected to the bifurcated links 33 and 34. These arms and links, as will be readily understood, form two toggle links. A housing 35, which is securely attached to the chassis frame, contains a U shaped leaf spring 36 and is provided with an opening 37 in which the long arm of the bell crank operates. In Fig. 3 the cover 38 has been removed from the housing. The spring is secured to the housing by a bolt 39, its ends are secured to pins 40 and 41 which are inserted in the bifurcated ends of the links 33 and 34, and the pressure of the spring is in the directions indicated by the arrows.

The functions of the shock absorber will now be explained. Reference is first had to Figs. 1 and 2. It will be seen that if one of the wheels of the car to which the device is attached receive a jolt, as for example from an uneven road, the rear axle 12, and consequently the connecting link 17, tends to raise against the tension of the main spring 11. This raising of the connecting link causes the bell crank 19 to turn and break toggle which is formed of the members 21 and 22. While the toggle is in its straight, or what may be termed its locked position, the spring 24 is neutral, but, when the toggle is broken, the tension of the spring is thrown into action. It acts on the main spring in the same direction as did the jolt. However, as the main spring starts to resume its original position, the spring 24 retards it and causes it to assume this position slowly and gradually, thus reducing the jar which would otherwise be imparted to the chassis and the body mounted thereon. By adjusting the screw 27 the tension of the spring 24 may be increased or decreased.

The action of the embodiment shown in Figs. 3 and 4 is similar to what has just been described. The breaking of the double toggles actuates the spring 36 in the same manner that the breaking of the single toggle in Fig. 1 actuates the spring 24.

Having described my invention, what I claim as new and wish to protect by Letters Patent is:

1. In combination with a chassis frame having a spring supported axle, a cantilever spring attached to said chassis frame, a link connected with and actuated by said axle, a series of levers connecting said link with the free end of the cantilever and normally locking it in a neutral position, the construction of the levers being such as to free the end of the cantilever when the distance between the chassis frame and the axle is varied from normal.

2. In combination with a chassis frame having a spring supported axle, a double cantilever spring attached to said chassis frame, a link connected with and actuated by said axle, a series of levers connecting said link with the free ends of the double cantilever spring and normally locking them in a neutral position, the construction of the levers being such as to release the ends of the double cantilever spring when the distance between the chassis frame and the axle is varied from normal.

3. In combination with a chassis frame having a spring supported axle, a cantilever spring attached to said chassis frame, means for adjusting the tension of said cantilever spring, a link connected with and actuated by said axle, a series of levers connecting said link with the free end of the cantilever spring and normally locking it in a neutral position, the construction of the levers being such as to free the end of the cantilever spring when the distance between the chassis frame and the axle is varied from normal.

4. In combination with a chassis frame having a spring supported axle, a double cantilever spring attached to said chassis frame and contained within a closed housing, a link connected with and actuated by said axle, a series of levers connecting said link with the free ends of the double cantilever spring and normally locking them in a neutral position, the construction of the levers being such as to release the ends of the double cantilever spring when the distance between the chassis frame and the axle is varied from normal.

FRED GITZENDANNER.